United States Patent
Cook et al.

(10) Patent No.: US 9,102,234 B2
(45) Date of Patent: Aug. 11, 2015

(54) POWER TRANSFER UNIT DISCONNECT

(75) Inventors: Dennis Cook, Royal Oak, MI (US);
Scott Wilson, Clawson, MI (US)

(73) Assignee: Linamar Corporation, Guelph, Ontario (CA)

( * ) Notice: Subject to any disclaimer, the term of this patent is extended or adjusted under 35 U.S.C. 154(b) by 112 days.

(21) Appl. No.: 14/112,690

(22) PCT Filed: Apr. 18, 2012

(86) PCT No.: PCT/US2012/034075
§ 371 (c)(1),
(2), (4) Date: Jan. 29, 2014

(87) PCT Pub. No.: WO2012/145396
PCT Pub. Date: Oct. 26, 2012

(65) Prior Publication Data
US 2014/0224066 A1    Aug. 14, 2014

Related U.S. Application Data

(60) Provisional application No. 61/476,490, filed on Apr. 18, 2011.

(51) Int. Cl.
*B60K 17/344* (2006.01)
*F16H 57/029* (2012.01)
*F16H 57/021* (2012.01)
*F16H 57/02* (2012.01)

(52) U.S. Cl.
CPC ............ *B60K 17/344* (2013.01); *F16H 57/029* (2013.01); *F16H 57/021* (2013.01); *F16H 2057/02052* (2013.01); *Y10T 74/19074* (2015.01)

(58) Field of Classification Search
CPC .................... F16H 57/029; F16H 2057/02052; B60K 17/344; Y10T 74/19074
USPC .................. 474/160, 184, 198–206, 220–253
See application file for complete search history.

(56) References Cited

U.S. PATENT DOCUMENTS 4,064,956 A * 12/1977 Wildey ....................... 180/24.05
4,476,952 A * 10/1984 Suzuki .......................... 180/247
4,625,584 A    12/1986 Onodera
(Continued)

FOREIGN PATENT DOCUMENTS

WO    2010103101    9/2010

*Primary Examiner* — William Kelleher
*Assistant Examiner* — Valentin Craciun
(74) *Attorney, Agent, or Firm* — Miller Canfield

(57) ABSTRACT

A power transfer unit in a front-wheel-drive based all-wheel-drive vehicle is operatively coupled to a transmission to continuously transfer rotational movement through a link shaft to a front wheel when the vehicle is in motion. The power transfer unit also selectively transfers rotational movement from the transmission to a rear driveline system. When the rear driveline system is connected to the transmission, lubricant contained within the housing is automatically distributed throughout the housing to lubricate components therein. When the rear driveline system is disconnected from the transmission, the lubricant contained within the housing is not distributed throughout the housing. Since rotation of the link shaft continues independently of the rear driveline system, bearings rotatably supporting the link shaft are isolated from the interior of the housing such that the bearings are lubricated by lubricant that is provided from outside the housing.

20 Claims, 5 Drawing Sheets

(56) References Cited

U.S. PATENT DOCUMENTS

| | | | |
|---|---|---|---|
| 4,704,917 A | 11/1987 | Hiroyasu | |
| 4,736,653 A | 4/1988 | Hayakawa et al. | |
| 4,848,508 A * | 7/1989 | Smirl et al. | 180/248 |
| 4,860,612 A * | 8/1989 | Dick et al. | 74/665 H |
| 5,323,871 A * | 6/1994 | Wilson et al. | 180/197 |
| 5,503,603 A * | 4/1996 | Adam et al. | 475/204 |
| 5,599,249 A * | 2/1997 | Zalewski et al. | 475/202 |
| 5,655,986 A * | 8/1997 | Wilson et al. | 475/204 |
| 5,697,861 A * | 12/1997 | Wilson | 475/198 |
| 5,740,697 A | 4/1998 | Yamase | |
| 6,679,348 B2 | 1/2004 | Handa et al. | |
| 2012/0238395 A1 * | 9/2012 | Peura et al. | 475/223 |

\* cited by examiner

POWER TRANSFER UNIT DISCONNECT

CROSS-REFERENCE TO RELATED APPLICATION

This application claims priority to and all the benefits of U.S. Provisional Application No. 61/476,490 filed on Apr. 18, 2011 and entitled "Power Transfer Unit Disconnect."

BACKGROUND OF THE INVENTION

Field of the Invention

The invention relates to a power transfer unit disconnect. More particularly, the invention relates to a power transfer unit for disconnecting a rear driveline system of a front-wheel-drive based all-wheel-drive automotive vehicle.

SUMMARY

According to one aspect of the invention, a power transfer unit is provided for disconnecting a rear driveline system of a front-wheel-drive based all-wheel-drive vehicle. The power transfer unit includes a housing and a link shaft that extends through an interior of the housing. The link shaft is rotatably supported at each end by a bearing and continuously transfers rotational movement from a transmission to a front wheel when the vehicle is in motion. The power transfer unit also includes first and second input shafts that are selectively coupled together to transfer rotational movement from the transmission to the rear driveline system. When the first and second input shafts are coupled together, lubricant contained within the housing is automatically distributed throughout the housing to lubricate components therein. The first and second input shafts are uncoupled from one another to disconnect the rear driveline system. When the first and second input shafts are uncoupled, the lubricant contained within the housing is not distributed throughout the housing. However, rotation of the link shaft will continue independently of whether the rear driveline system is disconnected such that the bearings rotatably supporting the link shaft require lubrication when the rear driveline system is disconnected. Therefore, the bearings rotatably supporting the link shaft are isolated from the interior of the housing such that the bearings are lubricated by lubricant that is provided from outside the housing.

BRIEF DESCRIPTION OF THE DRAWINGS

The invention will be readily appreciated as the same becomes better understood by reference to the following detailed description when considered in connection with the accompanying drawings wherein.

DETAILED DESCRIPTION OF THE EMBODIMENTS

Figure 1:
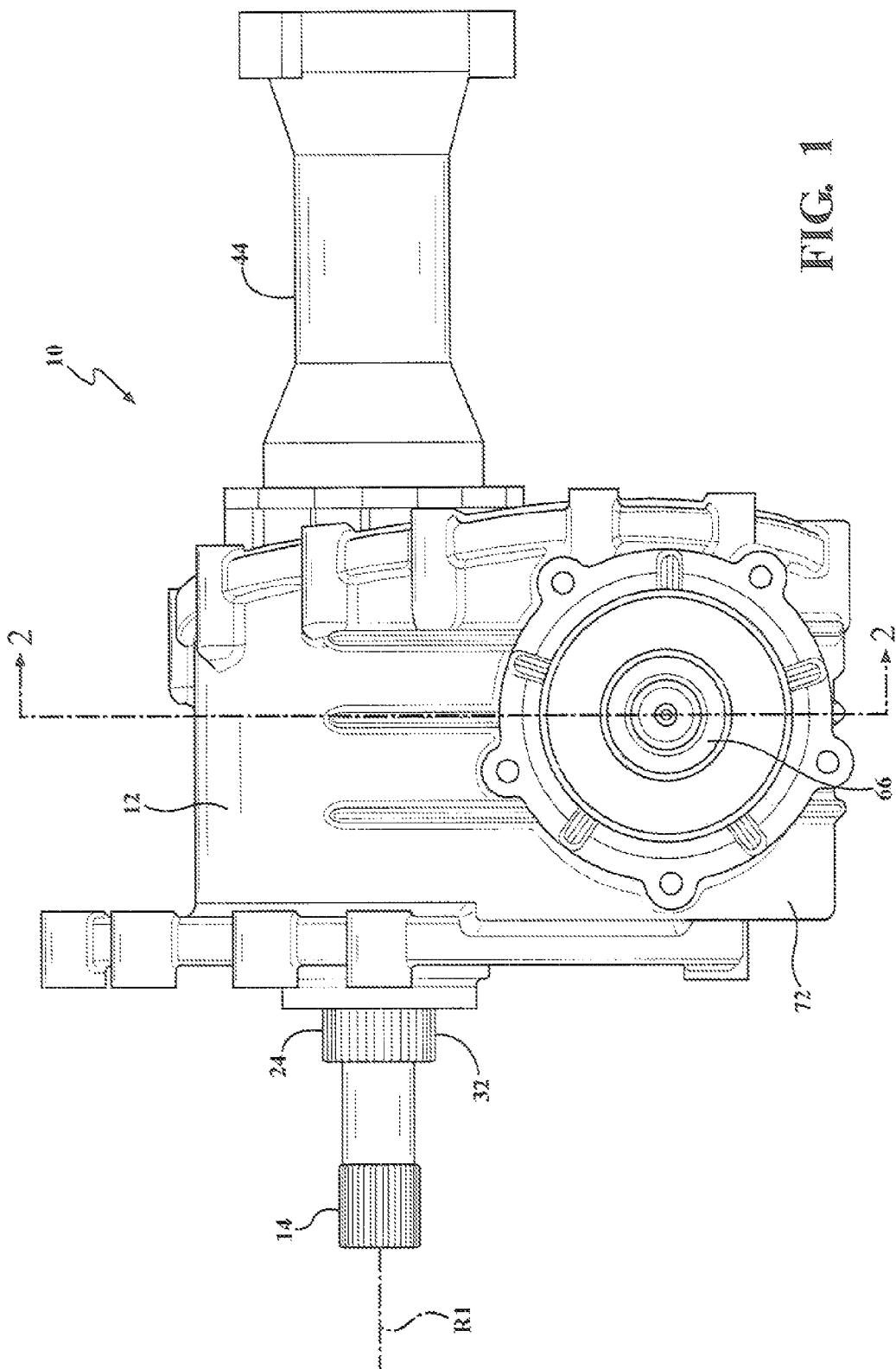
FIG. 1 is a rear view of a power transfer unit according to one embodiment of the invention.
Figure 2:
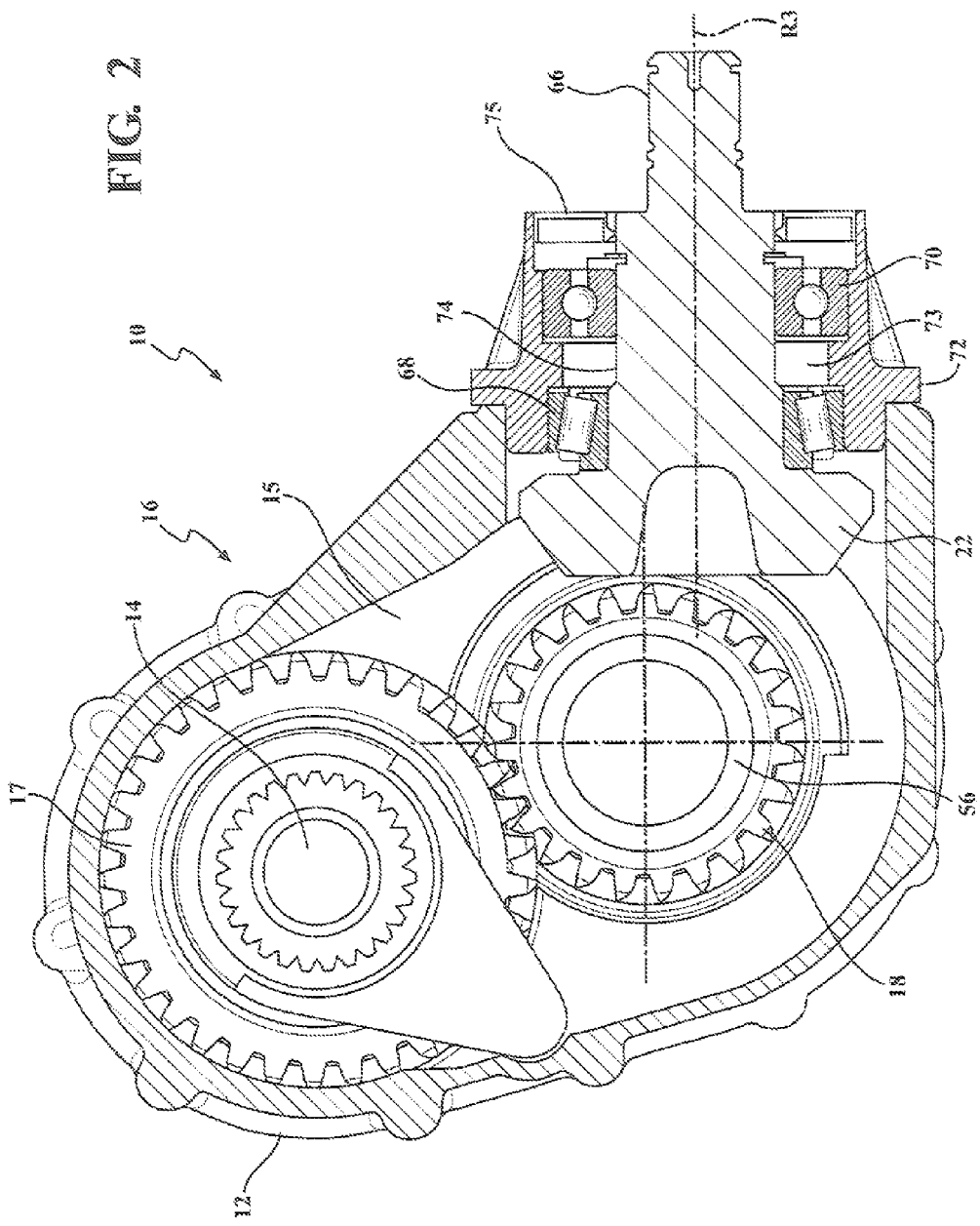
FIG. 2 is a cross-sectional view of the power transfer unit along lines 2-2 in FIG. 1.
Figure 3:
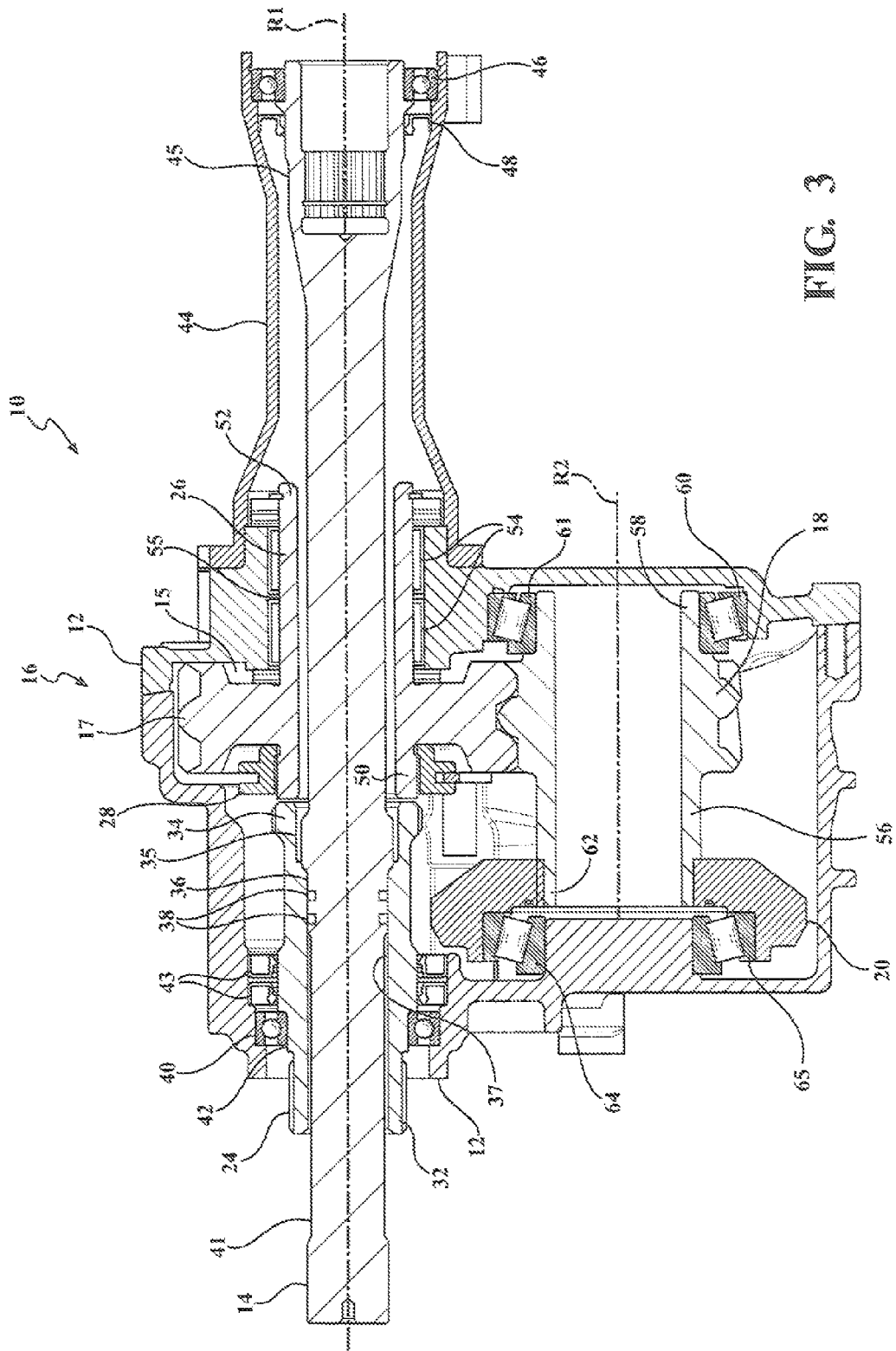
FIG. 3 is a rear cross-sectional view of the power transfer unit illustrating an uncoupled mode.
Figure 4:
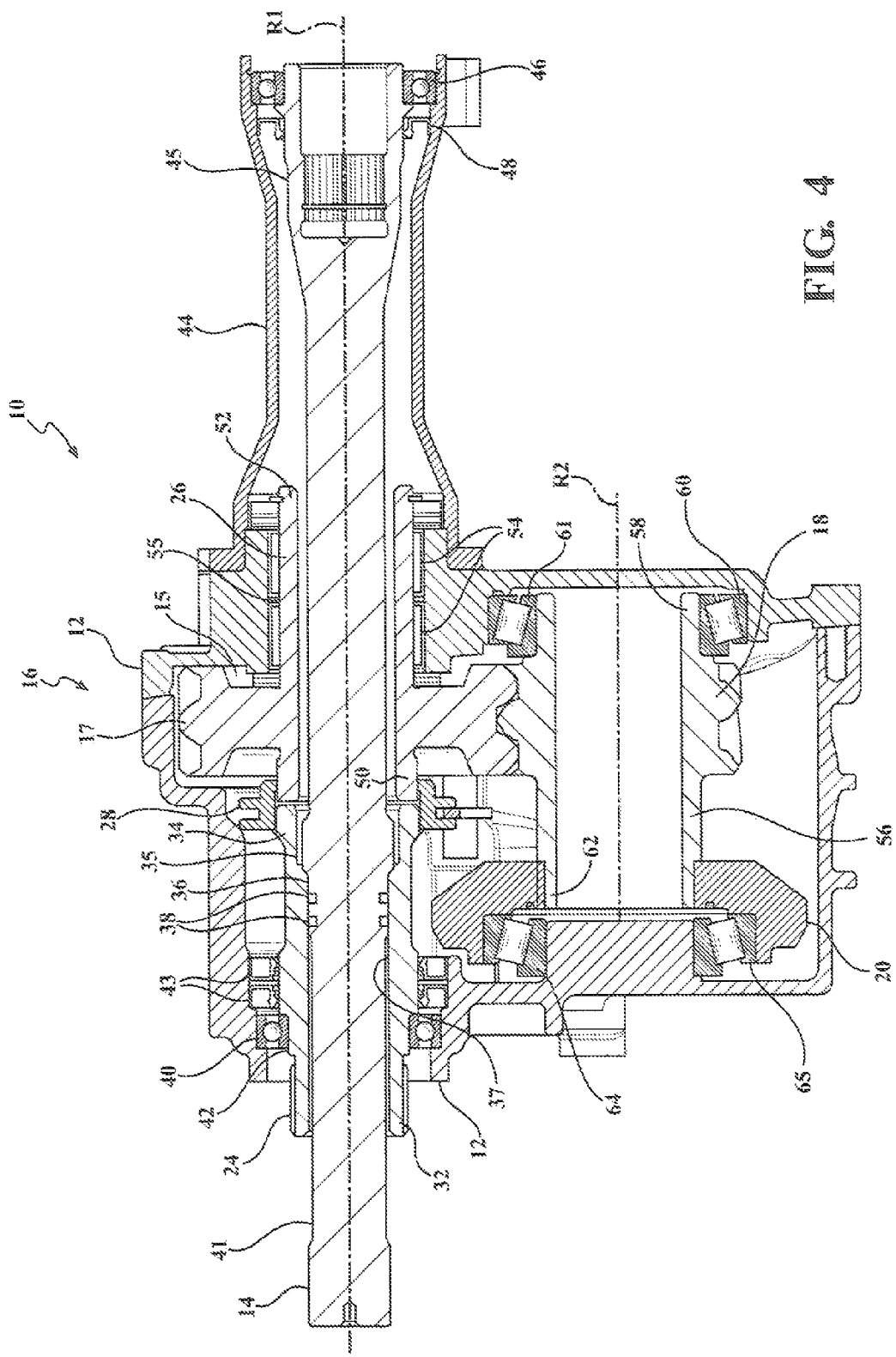
FIG. 4 is a rear cross-sectional view of the power transfer unit illustrating a coupled mode.

Referring to FIGS. 1 through 4, a power transfer unit (PTU) for a front-wheel-drive based all-wheel-drive vehicle is generally shown at 10. In front-wheel-drive based all-wheel-drive vehicles, engine torque (power) is always provided to the vehicle's front wheels when the vehicle is in motion. In contrast, power is only provided to the vehicle's rear wheels when it is required to improve traction, which may occur for example during snowy, icy or wet road conditions. When power to the rear wheels is not required it is desirable to reduce or eliminate parasitic losses associated with components that are not otherwise being used. The losses are associated with rotating components within the PTU 10 and rotating components of a rear driveline system (not shown) and typically include friction from gear meshes, bearing losses, churning lubricant losses, and rotating mass. The PTU 10 in the present invention is designed to disconnect the power to the rear driveline system.

The PTU 10 includes a transfer unit housing 12 and a single link shaft 14 extending in an axial direction through an interior 15 of the transfer unit housing 12. The link shaft 14 defines a first axis of rotation R1. The link shaft 14 is rotationally driven by a vehicle transmission (not shown) to transfer power to one of the front wheels of the vehicle. The other front wheel receives power from the transmission through another driven shaft (not shown). A gear train, generally shown at 16, is disposed in the interior 15 of the transfer unit housing 12 and transfers power from the transmission to the rear driveline system. The gear train 16 includes various components such as a driver gear 17, a driven gear 18, a ring gear 20 and a hypoid or pinion gear 22. As the gear train 16 transfers power from the transmission to the rear driveline system it changes the direction of power output ninety (90) degrees relative to the direction of power input. Rotation of the gear train components within the interior 15 of the transfer unit housing 12 causes PTU lubricant that resides in a lower portion of the transfer unit housing 12 to be automatically distributed throughout the transfer unit housing 12, thereby lubricating the gear train components as well as any other rotating components within the transfer unit housing 12. When power to the rear wheels is not required, it is desirable to eliminate the rotating mass of the gear train components to gain an efficiency advantage. However, once the rotation of the gear train components is stopped, the PTU lubricant is no longer being distributed throughout the transfer unit housing 12 and any rotating components within the transfer unit housing 12 are not being sufficiently lubricated. If the vehicle is in motion, the link shaft 14 extending through the interior 15 of the transfer unit housing 12 will rotate to drive one of the vehicle's front wheels. Thus, it is critical that any bearing support for the link shaft 14 is continuously lubricated regardless of whether the gear train components are rotating.

Power from the transmission is selectively transmitted to the gear train 16 by a first input shaft 24 that is rotationally driven by the transmission and a second input shaft 26 that is operatively coupled with the drive train. The first input shaft 24 and the second input shaft 26 are not directly coupled together. Instead, a shift collar 28 is movable between a disengaged position, shown in FIG. 3, wherein the first input shaft 24 is uncoupled from the second input shaft 26, and an engaged position, shown in FIG. 4, wherein the first input shaft 24 is coupled with the second input shift 26. With the shift collar 28 in the disengaged position, the PTU 10 is in an uncoupled mode such that the gear train 16 is disconnected and no power is transferred from the transmission to the rear driveline system. In the uncoupled mode, however, the link shaft 14 continues to rotate to drive one of the vehicle's front wheels. Thus, when the PTU 10 is in the uncoupled mode, the vehicle is operating in front-wheel-drive only mode. Conversely, with the shift collar 28 in the engaged position, the PTU 10 is in a coupled mode such that the gear train 16 is connected and power is transferred from the transmission to the rear driveline system. In the coupled mode, the link shaft 14 continues to rotate to drive one of the vehicle's front wheels. Thus, when the PTU 10 is in the coupled mode, the vehicle is operating in all-wheel-drive mode.

Figure 5:
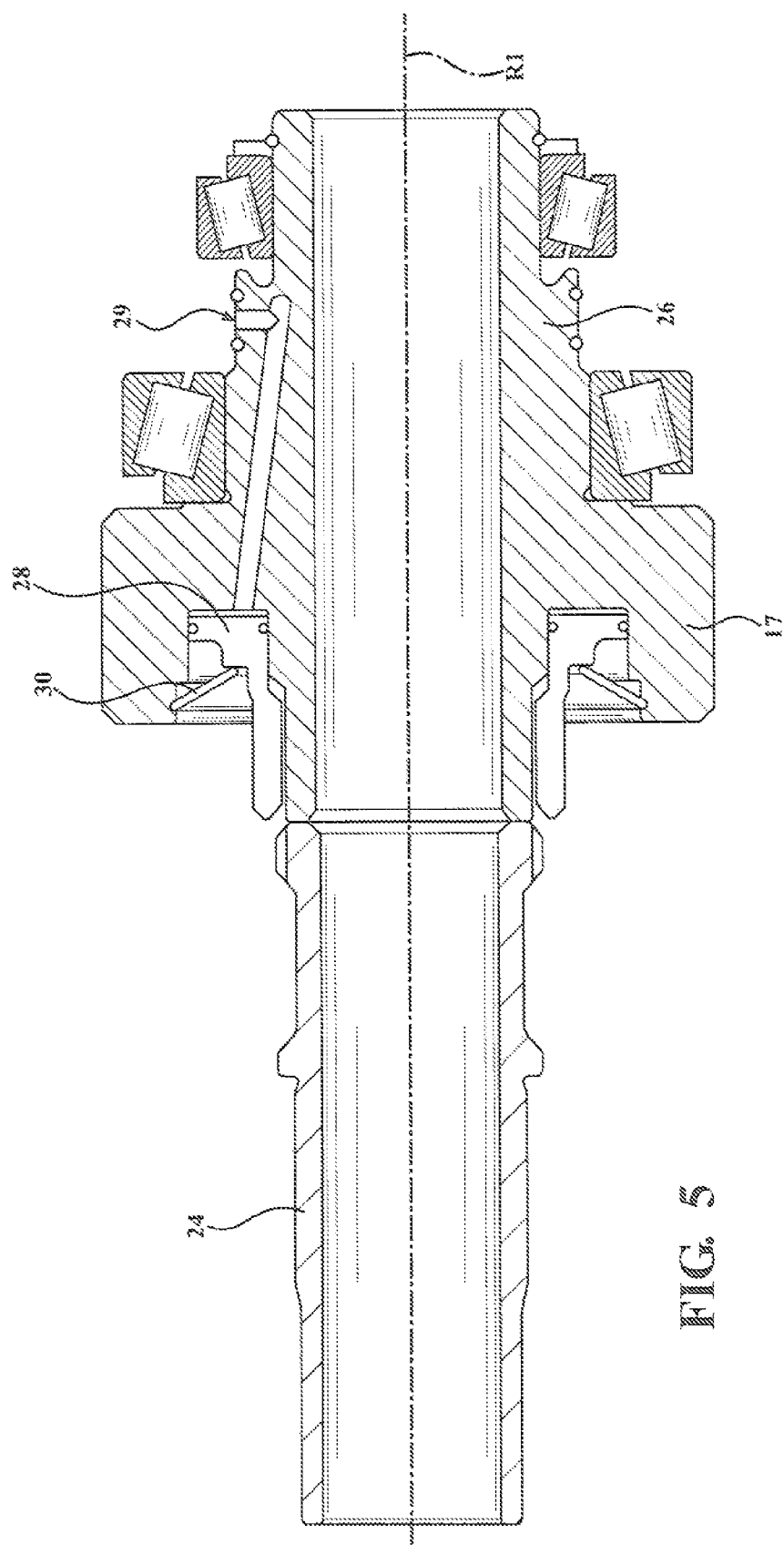
FIG. 5 is a fragmentary view of a shift collar actuation system for actuating the power transfer unit between the uncoupled and coupled modes.

It is contemplated that the shift collar 28 can be selectively actuated between the disengaged and engaged positions using any number of mechanisms or methods including manual, electric or hydraulic without varying from the scope of the invention. Referring to FIG. 5, an embodiment is shown wherein an oil passage 29 extends through the second input shaft 26 and is in fluid communication with the shift collar 28. The oil passage 29 is adapted to receive pressurized oil to actuate the shift collar 28 from the disengaged position to the engaged position. A return spring 30 biases the shift collar 28 toward the disengaged position. Thus, the return spring 30 is provided to return the shift collar 28 from the engaged position to the disengaged position.

The link shaft 14 is coaxial with the first and second input shafts 24, 26 and extends axially through the first input shaft 24 and the second input shaft 26. The first input shaft 24 can be splined with the link shaft 14 such that the first input shaft 24 and the link shaft 14 rotate together. Alternatively, the first input shaft 24 and the link shaft 14 can rotate independently and at different speeds. The first input shaft 24 extends in the axial direction between an outer end 32 that is driven by the transmission and an inner end 34 that is disposed within the interior 15 of the transfer unit housing 12. A perma-glide type bushing 35 is disposed radially between an outer surface 36 of the link shaft 14 and an inner surface 37 of the first input shaft 24 at the inner end 34 thereof. It is understood that the perma-glide type bushing 35 requires little if any lubrication. A pair of first seals 38 is positioned in the axial direction outboard of the perma-glide type bushing 35. The first seals 38 are disposed radially between the outer surface 36 of the link shaft 14 and the inner surface 37 of the first input shaft 24 to prevent leakage of the PTU lubricant from within the transfer unit housing 12.

As mentioned above, the link shaft 14 always rotates if the vehicle is in motion and requires continuous lubrication of any bearing support. A first bearing support 40 supports a first end 41 of the link shaft 14 and is disposed radially between an outer surface 42 of the first input shaft 24 and the transfer unit housing 12. Further, the first bearing support 40 is positioned in the axial direction outboard of a pair of second seals 43. The second seals 43 are disposed radially between the outer surface 42 of the first input shaft 24 and the transfer unit housing 12. The second seals 43 isolate the first bearing support 40 from the interior 15 of the transfer unit housing 12. As such, the first bearing support 40 is lubricated by transmission lubricant rather than by the PTU lubricant. In addition, it is appreciated that the transmission lubricant will continuously lubricate the first bearing support 40 regardless of whether the gear train components are rotating within the transfer unit housing 12. In other words, the first bearing support 40 is lubricated by the transmission lubricant even when the PTU 10 is in the uncoupled mode. It is further appreciated that the second seals 43 prevent the transmission lubricant from leaking into the interior 15 of the transfer unit housing 12 and also prevent the PTU lubricant from leaking out of the transfer unit housing 12.

An extension housing 44 is fixedly secured to the transfer unit housing 12 to support a second end 45 of the link shaft 14. The second end 45 of the link shaft 14 is directly coupled to a half-shaft (not shown) for driving one of the vehicle's front wheels. A second bearing support 46 is disposed radially between the outer surface 36 of the link shaft 14 and the extension housing 44. Further, the second bearing support 46 is positioned in the axial direction outboard of a third seal 48. The third seal 48 is disposed radially between the outer surface 36 of the link shaft 14 and the extension housing 44. The third seal 48 isolates the second bearing support 46 from the interior 15 of the transfer unit housing 12. As such, the second bearing support 46 is lubricated by axle lubricant rather than by the PTU lubricant. In addition, it is appreciated that the axle lubricant will continuously lubricate the second bearing support 46 regardless of whether the gear train components are rotating within the transfer unit housing 12. In other words, the second bearing support 46 is lubricated by the axle lubricant even when the PTU 10 is in the uncoupled mode. It is further appreciated that the third seal 48 prevents the axle lubricant from leaking into the interior 15 of the transfer unit housing 12 and also prevents the PTU lubricant from leaking out of the transfer unit housing 12.

The second input shaft 26 extends between an inner end 50 adjacent to the inner end 34 of the first input shaft 24 and an outer end 52. The shift collar 28 is slidably mounted along the inner end 50 of the second input shaft 26 for movement between the disengaged position and the engaged position, as described above. A pair of needle roller bearings 54 is disposed radially between an outer surface 55 of the second input shaft 26, generally adjacent the outer end 52, and the transfer unit housing 12. The driver gear 16 is mounted on the second input shaft 26 for rotation therewith and is positioned axially between the shift collar 28 and the pair of needle roller bearings 54. The driver gear 16 meshingly engages the driven gear 18. The driven gear 18 is mounted on a driven shaft 56 for rotation therewith. The driven shaft 56 defines a second axis of rotation R2 that is generally parallel with the first axis of rotation R1 of the link shaft 14. The driven shaft 56 is rotatably supported at one end 58 by a first tapered roller bearing 60 that is disposed radially between an outer surface 61 of the driven shaft 56 and the transfer unit housing 12. An opposite end 62 of the driven shaft 56 is rotatably supported by a second tapered roller bearing 64. More specifically, the ring gear 20 is mounted on the opposite end 62 of the driven shaft 56 for rotation therewith and the second tapered roller bearing 64 is disposed radially between a flange 65 on the ring gear 20 and the transfer unit housing 12. The ring gear 20 meshingly engages the pinion gear 22 such that when the PTU 10 is in the coupled mode the pinion gear 22 rotates, which in turn rotates a rear prop-shaft or driveshaft (not shown) that is operatively coupled to and drives the rear wheels. The pinion gear 22 is mounted on a pinion gear shaft 66 for rotation therewith and the pinion gear shaft 66 is rotatably supported by a third tapered roller bearing 68 and a third bearing support 70 in a pinion housing 72. The pinion gear shaft 66 defines a third axis of rotation R3 that is generally orthogonal to the first axis of rotation R1 of the link shaft 14. The pinion housing 72 is fixedly secured to the transfer unit housing 12 such that an interior 73 of the pinion housing 72 is in fluid communication with the interior 15 of the transfer unit housing 12. Both the third taper roller bearing 68 and the third bearing support 70 are disposed radially between an outer surface 74 of the pinion gear shaft 66 and the pinion housing 72.

A fourth seal 75 is disposed radially between the outer surface 74 of the pinion gear shaft 66 and the pinion housing 72. However, in contrast to the second and third seals 43, 48 described above, the fourth seal 75 is positioned outboard of the third bearing support 70. Thus, the fourth seal 75 does not isolate the third bearing support 70 from the interior 73 of the pinion housing 72 and the interior 15 of the transfer unit housing 12. As such, the PTU lubricant will lubricate the third bearing support 70. It is understood, however, that the pinion gear shaft 66 only rotates when the gear train components are rotating within the transfer unit housing 12, i.e., when the PTU 10 is in the coupled mode. Thus, there is no requirement that the third bearing support 70 be continuously lubricated. It is further appreciated that the fourth seal 75 prevents the PTU lubricant from leaking out of the interior 73 of the pinion housing 72 and the interior 15 of the transfer unit housing 12.

The invention has been described in an illustrative manner. It is to be understood that the terminology, which has been used, is intended to be in the nature of words of description rather than of limitation. Many modifications and variations of the invention are possible in light of the above teachings. Therefore, within the scope of the appended claims, the invention may be practiced other than as specifically described.

What is claimed:

1. A power transfer unit for a motor vehicle for transferring rotational movement from a transmission to a front wheel and selectively transferring rotational movement from the transmission to a rear driveline system, said power transfer unit comprising:
   a transfer unit housing defining an interior;
   a link shaft extending from outside said transfer unit housing and substantially through said interior of said transfer unit housing, said link shaft including an outer surface, wherein said link shaft is continuously rotationally driven by the transmission when the vehicle is in motion and transfers rotational movement to the front wheel;
   a first input shaft extending from outside said transfer unit housing into said interior of said transfer unit housing, said first input shaft is coaxial with said link shaft and said link shaft extends axially through said first input shaft, said first input shaft including an inner surface and an outer surface, wherein said first input shaft is rotationally driven by the transmission;
   a second input shaft disposed within said interior of said transfer unit housing, said second input shaft is coaxial with said link shaft and said link shaft extends axially through said second input shaft, wherein said second input shaft is selectively coupled with said first input shaft to transfer rotational movement to the rear driveline system;
   at least one first seal disposed radially between said outer surface of said link shaft and said inner surface of said first input shaft to contain lubricant within said interior of said transfer unit housing;
   a first bearing support disposed radially between said outer surface of said first input shaft and said transfer unit housing for rotatably supporting said first input shaft;
   at least one second seal disposed radially between said outer surface of said first input shaft and said transfer unit housing to contain lubricant within said interior of said transfer unit housing, wherein said at least one second seal is positioned axially inboard of said first bearing support relative to said interior of said transfer unit housing;
   a second bearing support disposed radially between said outer surface of said link shaft and said transfer unit housing for rotatably supporting said link shaft; and
   at least one third seal disposed radially between said outer surface of said link shaft and said transfer unit housing to contain lubricant within said interior of said transfer unit housing, wherein said at least one third seal is positioned axially inboard of said second bearing support relative to said interior of said transfer unit housing.

2. The power transfer unit as set forth in claim 1 further including a bushing disposed radially between said outer surface of said link shaft and said inner surface of said first input shaft for rotatably supporting said link shaft, wherein said at least one first seal is positioned axially outboard of said bushing relative to said interior of said transfer unit housing.

3. The power transfer unit as set forth in claim 2 further including a shift collar that is selectively actuated between a disengaged position, wherein said first input shaft is uncoupled from said second input shaft, and an engaged position, wherein said first input shaft is coupled with said second input shaft.

4. The power transfer unit as set forth in claim 3 wherein said second input shaft includes an oil passage extending therethrough, said oil passage in fluid communication with said shift collar for actuating said shift collar from said disengaged position to said engaged position.

5. The power transfer unit as set forth in claim 4 further including a return spring for biasing said shift collar to said disengaged position.

6. The power transfer unit as set forth in claim 3 wherein said second input shaft includes an outer surface, and wherein a bearing is disposed radially between said outer surface of said second input shaft and said transfer unit housing for rotatably supporting said second input shaft.

7. The power transfer unit as set forth in claim 6 further including a gear train disposed in said interior of said transfer unit housing, said gear train transferring rotational movement from said second input shaft to the rear driveline system.

8. The power transfer unit as set forth in claim 7 wherein said gear train includes a driver gear mounted on said second input shaft for rotation therewith, a driven gear mounted on a driven shaft for rotation therewith, wherein said driven gear is meshingly engaged with said driver gear, a ring gear mounted on said driven shaft for rotation therewith, and a pinion gear mounted on a pinion gear shaft for rotation therewith, wherein said pinion gear is meshingly engaged with said ring gear.

9. The power transfer unit as set forth in claim 8 wherein said link shaft defines a first axis of rotation.

10. The power transfer unit as set forth in claim 9 wherein said driven shaft defines a second axis of rotation that is generally parallel to said first axis of rotation.

11. The power transfer unit as set forth in claim 10 wherein said pinion gear shaft defines a third axis of rotation generally orthogonal to said first axis of rotation.

12. A power transfer unit for a motor vehicle for transferring rotational movement from a transmission to a front wheel and selectively transferring rotational movement from the transmission to a rear driveline system, said power transfer unit comprising:
   a transfer unit housing;
   a link shaft extending in an axial direction between a first end and a second end, thereby defining a first axis of rotation, wherein said first end of said link shaft is disposed outside said transfer unit housing and said second end is disposed inside said transfer unit housing, and wherein said first end is continuously rotationally drive by the transmission when the vehicle is in motion, and wherein said second end is adapted to be coupled to the front wheel;
   a first input shaft extending in said axial direction between an outer end disposed outside said transfer unit housing and an inner end disposed inside said transfer unit housing, said first input shaft is coaxial with said link shaft and said link shaft extends axially entirely through said first input shaft, wherein said outer end of said first input shaft is rotationally driven by the transmission;
a second input shaft extending between an inner end disposed inside said transfer unit housing and an outer end disposed inside said transfer unit housing, said inner end of said second input shaft adjacent said inner end of said first input shaft, said second input shaft is coaxial with said link shaft and said link shaft extends axially entirely through said second input shaft, wherein said second input shaft is selectively coupled with said first input shaft to transfer rotational movement to the rear driveline system;
at least one first seal disposed radially between said link shaft and said first input shaft to contain lubricant within said transfer unit housing;
a first bearing support disposed radially between said first input shaft and said transfer unit housing for rotatably supporting said first input shaft;
at least one second seal disposed radially between said first input shaft and said transfer unit housing to contain lubricant within said transfer unit housing, wherein said at least one second seal is positioned axially between said first bearing support and said inner end of said first input shaft;
a second bearing support disposed radially between said link shaft and said transfer unit housing for rotatably supporting said link shaft; and
at least one third seal disposed radially between said link shaft and said transfer unit housing to contain lubricant within said transfer unit housing, wherein said at least one third seal is positioned axially between said second bearing support and said first end of said link shaft.

13. The power transfer unit as set forth in claim 12 further including a bushing disposed radially between said link shaft and said first input shaft for rotatably supporting said link shaft, wherein said at least one first seal is positioned axially between said bushing and said first end of said link shaft.

14. The power transfer unit as set forth in claim 13 further including a shift collar that is selectively actuated between a disengaged position, wherein said first input shaft is uncoupled from said second input shaft, and an engaged position, wherein said first input shaft is coupled with said second input shaft.

15. The power transfer unit as set forth in claim 14 wherein said link shaft defines an axis of rotation.

16. The power transfer unit as set forth in claim 15 further including a gear train disposed within said transfer unit housing, said gear train transferring rotational movement from said second input shaft to the rear driveline system, wherein said gear train includes a pinion gear shaft defining an axis of rotation generally orthogonal to said axis of rotation of said link shaft.

17. A power transfer unit for a motor vehicle for transferring rotational movement from a transmission to a front wheel and selectively transferring rotational movement from the transmission to a rear driveline system, said power transfer unit comprising:
a transfer unit housing defining an interior;
a link shaft extending in an axial direction through said transfer unit housing, wherein said link shaft is continuously rotationally driven by the transmission when the vehicle is in motion and transfers rotational movement to the front wheel;
a first input shaft extending in said axial direction, wherein said first input shaft is coaxial with said link shaft and said link shaft extends axially through said first input shaft, and wherein said first input shaft is rotationally driven by the transmission;
a second input shaft extending in said axial direction, said second input shaft is coaxial with said link shaft and said link shaft extends axially through said second input shaft, wherein said second input shaft is selectively coupled with said first input shaft to transfer rotational movement to the rear driveline system;
at least one first seal disposed radially between said link shaft and said first input shaft to contain lubricant within said interior of said transfer unit housing;
a first bearing support disposed radially between said first input shaft and said transfer unit housing for rotatably supporting said first input shaft;
at least one second seal disposed radially between said first input shaft and said transfer unit housing to contain lubricant within said interior of said transfer unit housing, wherein said at least one second seal is positioned axially inboard of said first bearing support relative to said interior of said transfer unit housing;
a second bearing support disposed radially between said link shaft and said transfer unit housing for rotatably supporting said link shaft; and
at least one third seal disposed radially between said link shaft and said transfer unit housing to contain lubricant within said interior of said transfer unit housing, wherein said at least one third seal is positioned axially inboard of said second bearing support relative to said interior of said transfer unit housing.

18. The power transfer unit as set forth in claim 17 further including a bushing disposed radially between said link shaft and said first input shaft for rotatably supporting said link shaft, wherein said at least one first seal is positioned axially outboard of said bushing relative to said interior of said transfer unit housing.

19. The power transfer unit as set forth in claim 18 further including a shift collar that is selectively actuated between a disengaged position, wherein said first input shaft is uncoupled from said second input shaft, and an engaged position, wherein said first input shaft is coupled with said second input shaft.

20. The power transfer unit as set forth in claim 19 further including a gear train disposed within said interior of said transfer unit housing, said gear train transferring rotational movement from said second input shaft to the rear driveline system, wherein said gear train includes a pinion gear shaft defining an axis of rotation generally orthogonal to an axis of rotation of said link shaft.

* * * * *